(12) United States Patent
McKown et al.

(10) Patent No.: US 9,020,690 B2
(45) Date of Patent: Apr. 28, 2015

(54) QUALIFYING AUTOMATIC VEHICLE CRASH EMERGENCY CALLS TO PUBLIC SAFETY ANSWERING POINTS

(71) Applicant: Guardity Technologies, Inc., Plano, TX (US)

(72) Inventors: Russell Carl McKown, Richardson, TX (US); Joseph Thomas Mader, Plano, TX (US)

(73) Assignee: Guardity Technologies, Inc., Plano, TX (US)

( * ) Notice: Subject to any disclaimer, the term of this patent is extended or adjusted under 35 U.S.C. 154(b) by 0 days.

(21) Appl. No.: 13/907,880

(22) Filed: Jun. 1, 2013

(65) Prior Publication Data

US 2013/0332026 A1    Dec. 12, 2013

Related U.S. Application Data

(60) Provisional application No. 61/658,598, filed on Jun. 12, 2012.

(51) Int. Cl.
*B60R 21/013* (2006.01)
*H04W 4/22* (2009.01)
*G08B 25/01* (2006.01)
*G08B 25/10* (2006.01)
*B60R 21/00* (2006.01)

(52) U.S. Cl.
CPC .............. *H04W 4/22* (2013.01); *B60R 21/013* (2013.01); *G08B 25/016* (2013.01); *G08B 25/10* (2013.01); *B60R 2021/0027* (2013.01)

(58) Field of Classification Search
CPC ...................... B60R 21/013; B60R 2021/0027
USPC .............................................. 701/33
See application file for complete search history.

(56) References Cited

U.S. PATENT DOCUMENTS

| | | | | |
|---|---|---|---|---|
| 6,076,028 A | * | 6/2000 | Donnelly et al. | 701/45 |
| 6,327,528 B1 | * | 12/2001 | Vallette et al. | 701/45 |
| 6,517,107 B2 | * | 2/2003 | Johnson et al. | 280/735 |
| 6,557,889 B2 | * | 5/2003 | Breed | 280/735 |
| 7,177,397 B2 | * | 2/2007 | McCalmont et al. | 379/45 |
| 7,284,769 B2 | * | 10/2007 | Breed | 280/735 |
| 7,832,762 B2 | * | 11/2010 | Breed | 280/735 |
| 8,085,139 B2 | * | 12/2011 | Kanevsky et al. | 340/436 |
| 2006/0011399 A1 | * | 1/2006 | Brockway et al. | 180/272 |

(Continued)

OTHER PUBLICATIONS

David Erwin, Automatic Collision Notification and Vehicle Telematics Technical Information Document (TID), Jun. 1, 2007, NENA 07-504, Published by NENA.

(Continued)

*Primary Examiner* — Thomas Tarcza
*Assistant Examiner* — Alex C Dunn

(57) ABSTRACT

The present application provides methods for in-vehicle emergency telematics devices and systems to automatically qualify vehicle crash events before directly placing a 3-digit emergency call from an in-vehicle TCU to a local PSAP operator. The qualification is performed in two stages. The first stage produces a qualified crash detection decision wherein a preliminary crash detection based on impact sensors is qualified by crash related non-impact sensors and vehicle telemetry data. The second stage uses an injury severity prediction algorithm to score the detected crash and produces a decision as to whether the crash warrants an emergency call to the PSAP operator.

11 Claims, 7 Drawing Sheets

(56) References Cited

U.S. PATENT DOCUMENTS

| | | | |
|---|---|---|---|
| 2010/0227582 A1* | 9/2010 | Berry et al. | 455/404.1 |
| 2011/0096912 A1* | 4/2011 | Stahlin et al. | 379/39 |
| 2011/0098016 A1* | 4/2011 | Hatton | 455/404.2 |
| 2011/0201302 A1* | 8/2011 | Hatton | 455/404.2 |
| 2013/0309994 A1* | 11/2013 | Hellwig et al. | 455/404.2 |

OTHER PUBLICATIONS

DocuTable of Contents.

Recommendations From the Expert Panel: Advanced Automatic Collision Notification and Triage of the Injured Patient, U.S. Department of Health and Human Services Centers for Disease Control and Prevention.

Tomas, Tvrzsky, Ertico—Its Europe, D2.1 Functional and Operational requirements Report, Delivery date: Sep. 20, 2011.

Ching-Yao Chan, On the Detection of Vehicular Crashes—System Characteristics and Architecture, IEEE Transactions on Vehicular Technology, vol. 51, No. 1, Jan. 2002.

Jeffrey Augenstein, Kennerly Digges, Sandra Ogata, Elana Perdeck, James Stratton, Development and Validation of the Urgency Algorithm to Predict Compelling Injuries.

Douglas W Kononena, Carol A.C. Flannaganb, Stewart C Wangc, Accident Analysis and Prevention, Accepted Jul. 29, 2010, © 2010 Elsevier Ltd.

Tom Seekins (University of Montana), Alan Blatt (Cubrc), Marie Flanigan (Cubrc), Characterization of Pathways for Delivery of Crash Telemetry Data to Montana, Montana Automatic Crash Notification Project TechNote Deliverable for Revised Task 2 Version 2, Jul. 8, 2011.

Recommendations of the National Mayday Readiness Initiative, ComCare Alliance, US Department of Transportation, Oct. 23, 2000.

* cited by examiner

FIG. 5

ISP Coefficient / Parameter Table

| ISP Coefficient | Description (Parameter) | Input Source | Source Module | Available to Qualify 911 Call |
|---|---|---|---|---|
| Cdv | Delta Velocity (DeltaV) | Impact Sensor Crash Detection | 340 (240) | Yes |
| Cdoi | Direction of Impact (DOI) | Impact Sensor Crash Detection | 340 (240) | Yes |
| Cmulti | Multiple Impacts | Impact Sensor Crash Detection | 340 (240) | Yes |
| Cbelt | Seatbelts in Use | Vehicle Telemetry | 330/332 (230) | Yes |
| Cveh | Vehicle Type | Vehicle Telemetry | 330/332 (230) | Yes |
| Cold | Older Occupant | 911 Operator Q&A | 280 | No |
| Cfem | Female Occupant | 911 Operator Q&A | 280 | No |

QUALIFYING AUTOMATIC VEHICLE CRASH EMERGENCY CALLS TO PUBLIC SAFETY ANSWERING POINTS

CROSS-REFERENCE TO RELATED APPLICATIONS

This application claim priority to U.S. provisional application No. 61/658,598, entitled "Qualifying Automatic Vehicle Crash Emergency Calls to Public Safety Answering Points", dated Jun. 12, 2012. This application is related to application Ser. No. 13/276,991, entitled "Detecting a Transport Emergency Event and Directly Enabling Emergency Services", filed on Oct. 19, 2011, and application ser. No. 13/907,883 entitled "Qualifying Automatic Vehicle Crash Emergency Calls to Public Safety Answering Points", filed on Jun. 1, 2013, and application ser. No. 13/907,885 entitled "Horn Input to In-Vehicle Devices and System", filed on Jun. 1, 2013, and application Ser. No. 13/907,887 entitled "Mounting Angle Calibration for an In-Vehicle Accelerometer Device", filed Jun. 8, 2013, and application ser. No. 13/907,889 entitled "Automatic Speech Message Validation of an Emergency Teletype Text Message", filed on Jun. 1, 2013. The contents of which are hereby incorporated by reference in their entireties.

FIELD OF THE APPLICATION

The present application relates to mobile communication devices, in-vehicle data-acquisition, automatic crash notification, and more particularly, the automatic direct notification of emergency services when a vehicle crash event is detected.

BACKGROUND OF THE APPLICATION

Automated emergency event notification telematics devices and systems can effectively and expeditiously directly notify 911 operators at the local Public Safety Answering Point (PSAP) of a transport emergency event. The 911 PSAP operators may then dispatch emergency personnel, such as an Emergency Medical Service (EMS) team, to the site of the transport emergency event. The types of emergency events detected include those involving a crash of the vehicle or other transport and any other emergency that warrants calling 911 by activating a HELP/PANIC/MAYDAY/SOS/911 function. These transports include cars, trucks, buses, trains, motorcycles, boats, aircraft, etc. For convenience and readability, all transport entities will be referred to as 'vehicles" herein.

The commercially available vehicle emergency notification systems, e.g., the OnStar® system from General Motors, Inc., use in-vehicle automatic crash notification (ACN) capabilities that to detect a crash and notify an associated telematics service provider (TSP) call center—but not the PSAP center. The early ACN systems relied on existing air-bag-deployment and fuel-pump-shutoff signals to 'detect' the crash. So-called advanced ACN (AACN) systems incorporate accelerometer data for crash detection and the telematics industry now extensively uses the AACN acronym. For readability herein, "AACN/TSP/PSAP" systems will refer to systems that involve a TSP and "AACN/PSAP" systems will refer to systems that do not. The known AACN emergency notification systems support both the HELP/MAYDAY function and the crash detection function.

With the 'traditional' AACN/TSP/PSAP emergency notification systems, if a crash is detected, an in-vehicle telecommunications control unit (TCU) places a voice and data call to the TSP to report the vehicle's global positioning satellite (GPS) determined location; and, in addition, to provide the TSP operator with important crash related data. These data may include: vehicle speed, crash impact magnitude, and angle of impact; the occurrence of a rollover and multiple impacts; and a computed injury severity prediction. The TSP operator then uses the vehicle location data to contact the 911 PSAP nearest to the accident location to request help. At that point, these systems may enable three-way voice communications between the vehicle occupants, the service center operator, and the 911 PSAP. Even if the occupants are unable to communicate, the location information is used to dispatch the closest emergency response services to the vehicle.

These traditional AACN/TSP/PSAP emergency notification systems, which have been used by OnStar, ATX, and Hughes TSPs, have several recognized problems. The problems with the traditional AACN/TSP/PSAP system are documented, for example, by Tom Seekins, Alan Blatt and Marie Flanigan in *Characterization of Pathways for Delivery of Crash Telemetry Data to Montana*, Technical Note, Montana Automatic Crash Notification Project, July 2011.

A primary problem is that the TSP-to-PSAP calls do not take advantage of the priority 911 network infrastructure but instead, these calls are received by the PSAP on non-priority administrative phone lines. These non-priority lines may be in use for routine administrative purposes. Also, since this type of TSP-to-PSAP call is not in the priority 911 queue it may simply not be answered for a long time during times of high 911 call activity. Other problems arise from the methods used by the operator at the remote TSP call center to determine the appropriate local PSAP to call based on the client vehicle's GPS location. The TSP call center's location-indexed PSAP administrative phone number directory is quite possibly out-of-date. As a result, the wrong PSAP may be called. Finally, once the appropriate TSP-to-PSAP call is achieved, the PSAP operator is required to obtain the crash/emergency location from a verbal transmission; perhaps a street address but possibly the multi-digit GPS coordinate data.

This round-about and error prone AACN-to-TSP-to-PSAP call procedure is in sharp contrast to a real 911 call to the PSAP wherein the caller's call-back number and location automatically and immediately appear on the 911 operator's display at the PSAP that is nearest to the 911 caller. After all, the US enhanced 911 (e911) system is designed to provide the PSAP operator with the caller's call-back number, i.e., the automatic number information (ANI) and the caller's location, i.e., the automatic location information (ALI)—without error and within seconds.

In summary, the traditional AACN/TSP/PSAP emergency notification systems have problems regarding the timely delivery of critical data to the PSAP operator. This critical data includes not only the victim's call-back number and the vehicle crash location, but also vehicle crash analysis data.

The importance of vehicle crash analysis data is well established. For example, the Center for Disease Control (CDC) sponsored an expert panel that provided recommendations for enhancing the AACN/TSP/PSAP crash notification system in order to save lives and lessen serious injuries. These recommendations are documented in *Advanced Automatic Collision Notification and Triage of the Injured Patient*, US Dept. Health and Human Services, CDC (2008). This expert panel identified specific crash data that is important for an injury severity prediction (ISP) analysis. The expert panel also recommended a protocol for the TSP operators to use which incorporates the ISP analysis both before and after the TSP operator calls the PSAP operator.

Efforts to solve the problems associated with the traditional AACN/TSP/PSAP emergency notification system can be described as falling in one of two fundamentally different solution categories:

Solutions that improve the effectiveness of the TSP operator as an emergency call intermediary; and Solutions that provide direct vehicle-to-PSAP emergency calls without requiring a TSP operator.

These two solution categories have different characteristics, costs, and technical challenges. The present application relates to the second solution category; direct-call AACN/PSAP emergency notification systems that do not require a TSP.

Technical approaches of the first solution category are designed to improve the effectiveness of the TSP operator as an emergency call intermediary. These approaches allow the TSP operator to initiate a 911 call from either the in-vehicle TCU or certain telecommunications network elements—eliminating the problematic TSP-to-PSAP call via a 10 digit administrative phone line. These approaches may also be attractive because they allow the TSP operator to qualify the emergency call. Section 2.2 of the NENA 07-504 (2007) document indicates approximately 13% to 20% of the emergency calls to the TSP operators are screened out and not passed on to the 911 emergency dispatch operators at the PSAP.

One of the approaches in the first solution category has been branded 'Priority Access' and, as discussed in *Characterization of Pathways for Delivery of Crash Telemetry Data to Montana*, (2011), is currently offered to US PSAPS by Intrado Inc. for service with the OnStar, ATX, and Hughes Telematics TSPs. The description of the Priority Access technology is consistent with U.S. Pat. No. 7,177,397 titled "Geographic Routing of Emergency Service Call Center Emergency Calls" assigned to Intrado. From the viewpoint of the PSAP operator, his or her equipment receives a 911 call which: 1) is identified as coming from a TSP; and 2) contains an ALI record that has been generated by the TSP. These fields can, for example, contain location data (e.g., latitude/longitude), a TSP 24×7 call-back number and the crash data analysis data.

Problems remain, however, even with these improvements to the AACN/TSP/PSAP emergency notification system. One remaining problem is that the only call-back access from the PSAP to the crash victim(s)/vehicle is still through the TSP. Another remaining problem is that the use of the TSP operator as an intermediary in the emergency event notification process introduces delay and risk. For example, consider the hypothetical question, "If I need to call 911, do I want to call somebody else and wait/depend on them to call 911, or do I want to just directly call 911?" A further remaining problem is the cost of the TSP service. The monthly or annual expense of a subscription/service contract with the TSP reduces the number of vehicle operators who participate in the AACN/TSP/PSAP emergency notification systems.

Technical approaches of the second solution category are designed to provide direct emergency calls from the in-vehicle TCU to the PSAP operator without requiring a TSP operator—or a TSP. For example, Section 3.3 of *Automatic Collision Notification and Vehicle Telematics Technical Information Document (TID)*, by David Irwin, NENA 07-504 (2007) discusses a direct in-vehicle TCU-to-PSAP emergency call with the use of TTY communications in addition to voice.

The European Union (EU) "eCall" initiative is by far the most extensive development in the second solution category, i.e., the development of a direct-call AACN/PSAP emergency notification system that does not require a TSP. There are many documents describing eCall, for example, *Harmonized eCall European Pilot, D2.1 Functional and Operational Requirements Report*, ERTICO—ITS Europe, Ver. 1.0 (2011). The eCall plan has an EU mandate to require that all new vehicles sold in Europe have eCall-standards-compliant telematics—as soon as 2015. These eCall compliant telematics systems contain a high performance in-band modem and are designed to directly place a "112" voice and data emergency call to a local PSAP in the event of a vehicle crash or HELP/MAYDAY emergency.

The concept of direct 3-digit emergency calls from the in-vehicle TCU to the PSAP operator without requiring a TSP was earlier promoted in the US. For example, in the year 2000, The Recommendations of the National Mayday Readiness Initiative (NMRI), US Dept. of Transportation (2000) explicitly recommended: "Direct delivery of telematics emergency calls and data to PSAPs should be accomplished when the affected parties agree that it is feasible and will enhance public safety. 'Direct delivery of telematics calls and data to PSAPs' simply means that the intervention of a human being at a private call center would no longer be required."

The NMRI was a public-private partnership of more than 20 national organizations co-sponsored by the US Department of Transportation and The ComCARE Alliance to address emergency notification issues arising between the TSPs and the PSAPs. The 'when feasible' part of the recommendation referred to the ability of the in-vehicle crash detection and analysis to: " . . . function without significant levels of false positives, that crash data can distinguish between serious crashes and "fender benders", and indeed can predict the probabilities of severe injury."

In summary, direct-call AACN/PSAP emergency notification systems that do not require a TSP have been officially recommended in the US since 2000 by NENA, APCO and NHTSA working together via the NMRI. The fundamental requirements the NMRI placed on these direct-911-call AACN systems are that they provide: 1) a proper qualification that the crash is a true emergency event and 2) a proper computation of a probability of serious injury.

The second NMRI requirement, "a proper computation of a probability of serious injury", is readily satisfied. The current state-of-the-art probability of serious injury computation is an improved ISP algorithm described by Douglas Kononen, Carol Flannagan and Stewart Wang, *Identification and validation of a logistic regression model for predicting serious injuries associated with motor vehicle crashes*, in Accident Analysis and Prevention 43 (2011). This straightforward ISP computation is based on the same crash data parameters that were previously recommended by the CDC Expert Panel in *Advanced Automatic Collision Notification and Triage of the Injured Patient*, US Dept. Health and Human Services, CDC (2008). These crash data parameters are measured by the OEM telematics systems required in the EU eCall initiative and also by the non-OEM (aftermarket) telematics devices and systems.

The first NMRI requirement, "that a direct-call AACN system provide a proper qualification that the crash is a true emergency event", is more problematic and the subject of the present application. Indeed, in the AACN/TSP/PSAP emergency notification systems, this is a primary function of the TSP operator. In the direct-call AACN/PSAP emergency notification systems this function must be automated. In the eCall-compliant OEM direct-call AACN systems, this crash emergency qualification function can build upon the existing known art of 'safing' or 'arming' airbag and seatbelt pre-tensioning deployments. However, even for OEM eCall systems, the desired automatic emergency event qualification is new. For example, it is a new requirement for OEM AACN systems to determine whether a crash that does not involve an airbag deployment warrants placing a 911 emergency call. For non-OEM AACN devices and systems, the required emergency event qualification task can be even more of a challenge due to a lack of access to crush zone impact sensors and various crash related data that the vehicle's OEM has declared as proprietary.

It would be optimal to provide a direct-call AACN/PSAP emergency notification system, method and non-transitory computer readable media that automatically qualify whether a vehicle crash is an emergency event that warrants a 911 call in the US (or a 112 call in the EU). This is in contrast to the AACN/TSP/PSAP emergency notification systems which use a TSP operator to perform the emergency event qualification. The latter systems require a TSP and have an associated service contract that limits their adaptation.

SUMMARY OF APPLICATION

The present application provides methods, systems and non-transitory computer readable media for in-vehicle emergency telematics solutions that automatically qualify vehicle crash events before directly placing a 3-digit emergency call from an in-vehicle TCU to a local PSAP operator. Once qualified as such an emergency event, the in-vehicle TCU immediately places a 3-digit emergency call that employs the emergency-call enhanced wireless network to provide the TCU call-back number and vehicle location to the appropriate PSAP operator. The PSAP operator may additionally receive the important ISP and related crash analysis data; and may then communicate directly with the vehicle occupants. In any case, the PSAP operator directly decides the appropriate dispatch of emergency service providers, if any, to the vehicle crash site. The automatic emergency event qualification capability that is desired for the direct-call AACN/PSAP emergency notification systems will encourage widespread adaptation of these systems due to the cost savings of not requiring a TSP. The qualification is performed in two stages. The first stage produces a qualified crash detection decision wherein a preliminary crash detection that is based on impact sensors is qualified by non-impact sensors and vehicle telemetry data that is available, for example, from the vehicles' standard on-board diagnostics (OBDII) port. The second stage produces a decision as to whether the qualified crash detection warrants an emergency call to the PSAP operator. The second stage uses an injury severity prediction algorithm to score the detected crash for the purposes of making user interaction and emergency call decisions.

FIG. 1 illustrates a diagram of an overview of an AACN/PSAP emergency notification system. The in-vehicle AACN device in this example embodiment directly notifies 911 services of a detected emergency event. The diagram of a vehicle 110 contains the in-vehicle AACN device 120 that is capable of determining if an emergency event has occurred, such as an airbag deploying. If so, the TCU of the AACN device is capable of utilizing an integrated, possibly non-activated, cellphone to place a direct call to a 911 operator at a PSAP dispatch center 160 using the access point 140 of the most readily available wireless network 150. As depicted in FIG. 1, an emergency event can be a crash of the vehicle into a tree.

In one embodiment of the present application, the AACN device utilizes one or more accelerometers to aid in the preliminary detection of a vehicle crash and qualifies the detection based on a microphone sensor. The microphone sound sensor may here be considered a non-impact sensor in that it does not directly measure the force of impact. Accelerometers are impact sensors. They allow vehicle crash events to be preliminarily detected as a sequence of large impacts or, equivalently, a sequence of sudden accelerations/decelerations, or, equivalently, a sequence of sudden forces acting on the vehicle. The qualification of the preliminary crash detection can be accomplished using digital data buffers to store the most recent 3 seconds or so of digital samples from both the accelerometers and the microphone. If the accelerometer data is truly associated with a vehicle crash, the sound data should indicate a sudden increase in amplitude during the time of the well-known accelerometer 'crash pulse' that is typically 50 to 150 milliseconds in duration. If there is not the expected increase in the ambient sound level during the brief 'crash pulse' it is likely that the preliminary crash detection is false and should be ignored.

In another embodiment of the present application, the AACN device uses vehicle speedometer telemetry data that is available from the OBDII port to qualify a preliminary crash detection that is based on the accelerometer data. If the time history of the vehicle speedometer data is inconsistent with a vehicle crash, for example, there is no change in vehicle speed that is associated with the crash pulse, then again, it is likely that the preliminary crash detection is false and should be ignored. In another embodiment of the application, the AACN contains a GPS receiver and derives vehicle speed from the changes in the GPS location data. The GPS derived vehicle speed can be used to qualify preliminary crash detections in the same manner as described for the speedometer data. In other embodiments of the present application, the AACN device systematically combines one or more non-impact sensors and one or more OBDII telemetry data types to jointly qualify a preliminary crash detection decision that is based on one or more impact sensors.

In another embodiment of the present application, the AACN device determines whether to initiate a 911 call based on the value of a computed ISP given crash related data associated with the qualified crash detection described above. Since the ISP is a probability of serious injury in units of percent (%), a high ISP value indicates an immediate 911 emergency call is warranted.

In another embodiment of the present application, the AACN device determines whether to initiate a 911 call based on an interactive voice response (IVR) system that is programmed to inquire of the vehicle occupants if they want to call 911 when certain emergency events are detected. The occupant response to the AACN's IVR generated speech question may be a verbal response that is interpreted using a sophisticated voice recognition system. In other embodiments, the occupant response may be a simple manual response in the form of a push button switch or a horn press.

In other embodiments of the present application, the AACN device qualifies the decision to initiate a 911 call based upon a systematic combination of: 1) the value of the ISP that is computed for the qualified crash detection; and 2) the occupant's response to the IVR speech question.

One example embodiment may provide a method that includes receiving accelerometer data indicating a change in a motor vehicle velocity, processing the accelerometer data to determine a preliminary crash detection decision that the motor vehicle may have experienced a crash based on an accelerometer crash pulse, processing at least one of microphone data obtained from a microphone during a time associated with the motor vehicle crash to determine a sound amplitude measurement data and velocity data of the motor vehicle obtained during the time associated with the motor vehicle crash, and comparing the accelerometer crash pulse to at least one of the sound amplitude measurement data and the velocity data, and determining the motor vehicle has been in a crash based on the comparing of the accelerometer crash pulse to at least one of the sound amplitude measurement data and the velocity data.

Another example embodiment may provide an apparatus that includes a receiver configured to receive accelerometer data indicating a change in a motor vehicle velocity, and a processor configured to process the accelerometer data to determine a preliminary crash detection decision that the motor vehicle may have experienced a crash based on an accelerometer crash pulse, process at least one of microphone data obtained from a microphone during a time associated with the motor vehicle crash to determine a sound amplitude measurement data and velocity data of the motor vehicle obtained during the time associated with the motor vehicle crash, compare the accelerometer crash pulse to at least one of the sound amplitude measurement data and the velocity data, and determine the motor vehicle has been in a crash based on the comparing of the accelerometer crash pulse to at least one of the sound amplitude measurement data and the velocity data.

Yet another example embodiment may provide a non-transitory computer readable storage medium configured to store instructions that when executed causes a processor to perform receiving accelerometer data indicating a change in a motor vehicle position, processing the accelerometer data to determine a preliminary crash detection decision that the motor vehicle has experienced a crash based on an accelerometer crash pulse, processing at least one of microphone data obtained from a microphone during a time associated with the motor vehicle crash to determine a sound amplitude measurement data and velocity data of the motor vehicle obtained during the time associated with the motor vehicle crash and comparing the accelerometer crash pulse to at least one of the sound amplitude measurement data and the velocity data and determining the motor vehicle has been in a crash based on the comparing of the accelerometer crash pulse to at least one of the sound amplitude measurement data and the velocity data.

BRIEF DESCRIPTION OF THE DRAWINGS

FIG. 5 is a table listing the coefficients of the ISP algorithm along with the input source and the availability at the time when the decision to call 911 is required.

DETAILED DESCRIPTION OF THE APPLICATION

The present application provides a system, method and non-transitory computer readable medium that provides in-vehicle emergency telematics solutions to automatically qualify vehicle crash events before directly placing a standard 3-digit emergency call to a local PSAP operator. The qualification is performed in two stages. The first stage produces a qualified crash detection decision wherein a preliminary crash detection based on impact sensors is qualified by non-impact sensors in addition to vehicle telemetry data that is available, for example, from the vehicles' OBDII port. The second stage uses an ISP algorithm to score the detected crash for the purpose of deciding if the crash warrants an emergency call to the PSAP operator. Although for readability this detailed description typically refers to the US "911" emergency calls, the application also applies to the EU eCall "112" emergency calls and to eCall compliant in-vehicle emergency telematics devices and systems.

Figure 1:
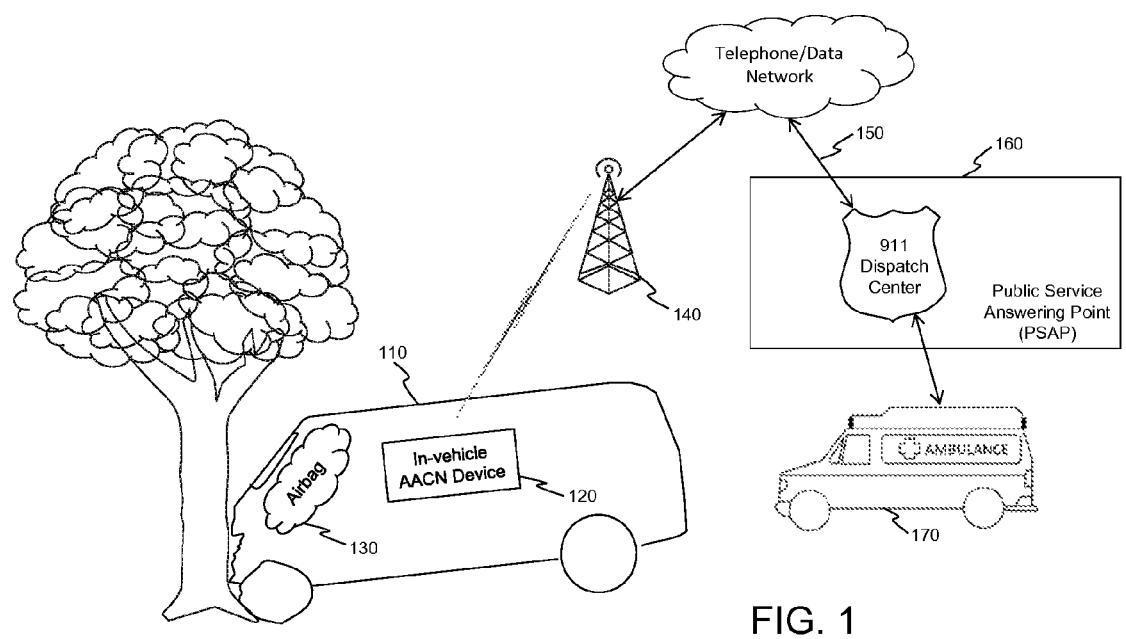
FIG. 1 depicts a diagram of an AACN system to directly notify 911 services of a detected emergency event in one embodiment.
Figure 2A:
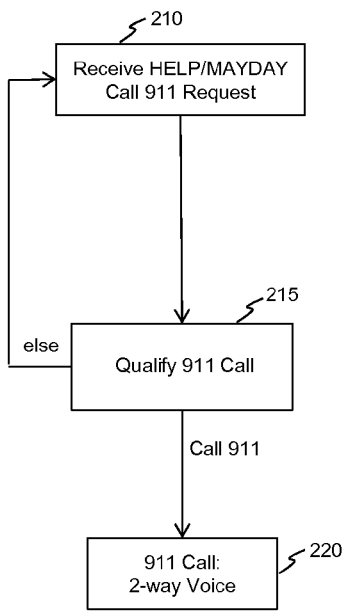
FIG. 2A depicts a diagram of an embodiment in which an AACN device or system places a direct 911 call in response to either a HELP/MAYDAY request or an automatic detection of a vehicle crash.

FIG. 2A illustrates a block diagram of an example embodiment of the present application in which an AACN device or system places a direct 911 call in response to either a HELP/MAYDAY emergency event or a vehicle crash emergency event. If a HELP/MAYDAY request is received 210, the request is qualified by operation 215. For example, operation 215 may require a repeat of the HELP/MAYDAY request to confirm the initial request before calling 911. If the request is confirmed, the in-vehicle TCU directly calls 911 220 and initiates a 2-way voice call between the occupants of the vehicle and the 911 operator at a PSAP dispatch center. This obvious 'repeat request' form of qualification of the HELP/MAYDAY event in a direct-call AACN/PSAP system is considered a satisfactory means of reducing false alarm calls to the PSAP operator. An embodiment of the present application provides processing for a vehicle crash emergency event as depicted in FIG. 2A. This processing is more advanced than the HELP/MAYDAY processing, in large part because detecting the vehicle crash event itself involves sensors and signal processing algorithms that can provide false alarms. In contrast, the HELP/MAYDAY event results from a human pushing a button.

Figure 2B:
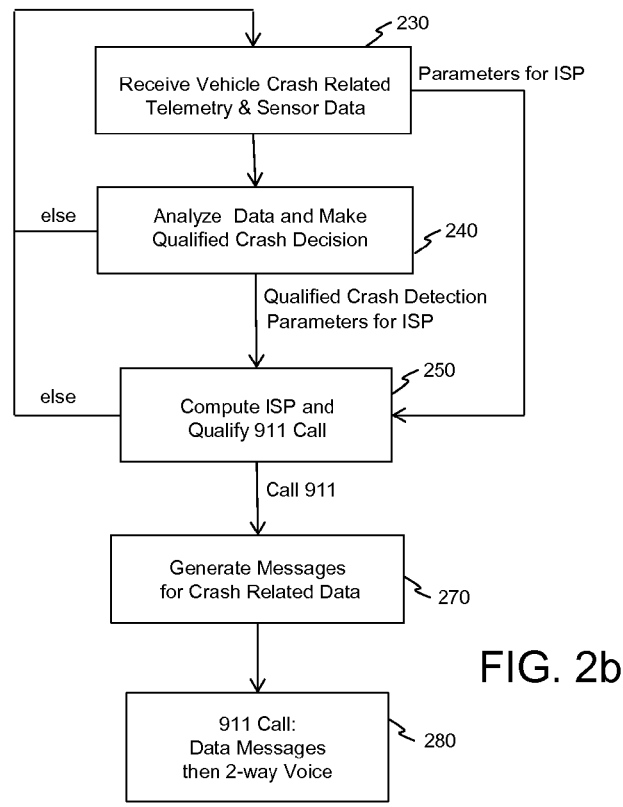
FIG. 2B depicts a diagram of an embodiment in which an AACN device or system places a direct 911 call in response to an automatic detection of a vehicle crash.

Referring to the vehicle crash event processing as depicted in FIG. 2B, operation 230 receives crash related data. For example, operation 230 may receive the AACN system's internal crash sensor data and may, in addition, receive externally generated crash related vehicle telemetry data that is made available to the AACN. These combined data are analyzed by operation 240 to: 1) make a preliminary crash detection decision that may be based on data from impact sensors and 2) make a qualified crash detection decision that may be based on validating data from non-impact sensors and crash related telemetry data. If there is no qualified crash detection, process control returns to operation 230. For qualified crash detections, operation 250 computes an ISP based on the relevant crash analysis parameters and qualifies a decision to call 911 (or not) as described below.

If the decision from operation 250 is to call 911, then this decision results in the activation of operation 270 which generates one or more data messages that contain crash related data that are of interest to the PSAP operator. These crash related data may include, for example, the delta-in-velocity (DeltaV), direction of impact (DOI), seatbelt usage, whether there were multiple impacts, and the vehicle type and, in addition, an ISP that is based on these data. The data messages generated by operation 270 are then input to operation 280 which: 1) initiates the 911 call, 2) sends the data messages to the PSAP and 3) establishes a 2-way voice call between the PSAP operator and the vehicle occupants.

Note that regarding operation 230 in FIG. 2, the type of crash related vehicle telemetry data that is made available to the AACN device or system varies. For non-OEM AACN device and system embodiments this crash related telemetry data may be limited. Fortunately, the OBDII standard insures that some crash related vehicle telemetry data is available through the OBDII port, including the vehicle identification number (VIN) and the speedometer data. The telemetry data required to be OBDII standard compliant is referred to as standard parameter identification (PID) or "standard PID" data. The vast majority of vehicle data is "non-standard PID" data. Vehicle OEMs offer licenses to non-OEM product manufacturers which provide access to additional crash related telemetry data that are non-standard PID data.

Also note that for OEM crash detection systems, preferred methods of receiving crash related sensor data (230) and processing this data to make a qualified crash detection decision (240) are to use distributed impact sensing systems. For example, OEM crash detection systems for airbag deployment typically use multiple pressure sensors in the peripheral crush zones of the vehicle body in addition to a 2-axis or 3-axis accelerometer in a non-crush zone associated with the interior occupant compartment. The airbag is not deployed unless both a crush-zone sensor and the non-crush zone sensor detect a vehicle crash suitable for airbag deployment.

Due to cost and installation restrictions, non-OEM crash detection systems may use only a non-crush zone accelerometer for impact sensing and preliminary crash detection. Other means are required to qualify that the preliminary crash detection is a true vehicle crash event so as to reduce the probability of placing a false alarm call to the 911 operator. The proposed method of making a qualified crash detection decision takes advantage of the independence of the three crash related data source types: 1) impact sensor; 2) non-impact sensor and 3) vehicle telemetry data. Requiring time correlated detection indications from multiple independent crash detection sources provides a means of reducing the probability of system failure defined as either failing to recognize a true crash or falsely reporting a crash.

Figure 3:
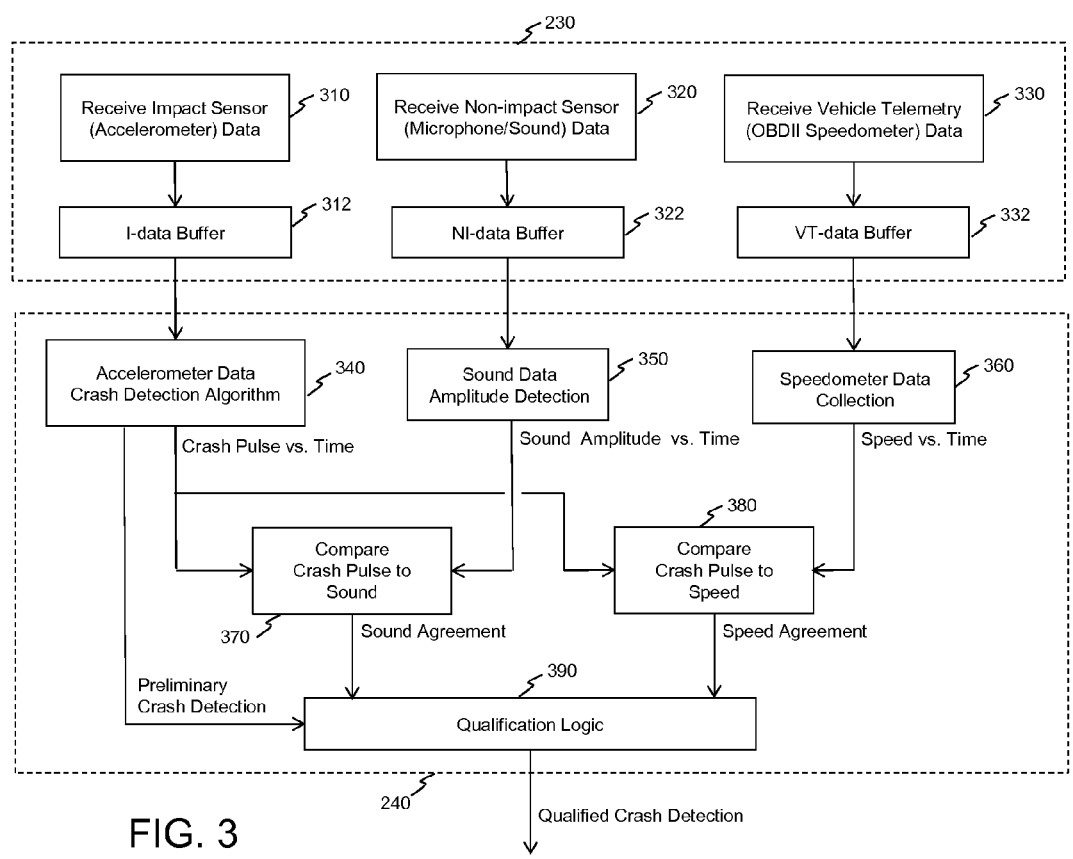
FIG. 3 depicts a diagram of an embodiment in which impact and non-impact sensor data and vehicle telemetry data is input and processed to form both a preliminary and a qualified automatic crash detection.

FIG. 3 shows a block diagram of an example embodiment for operations/modules 230 and 240 of the present application in which impact and non-impact sensor data and vehicle telemetry data is input 230 and processed 240 to form both a preliminary and a qualified automatic crash detection. In this embodiment, the impact sensor is an electronic 2-axis or 3-axis accelerometer sensor 310, the non-impact sensor is a microphone 320 and the vehicle telemetry data 330 is the speedometer data obtained as standard PID data from the OBDII port. Other embodiments may have different or additional impact sensors inputting data to the I-data Buffer 312, different or additional non-impact sensors inputting data to the NI-data Buffer 322, and different or additional vehicle telemetry data inputting to the VT-data Buffer 332.

The example embodiment of FIG. 3 illustrates the operations of forming a preliminary crash detection based on data from impact sensors and then qualifying the detection based on an agreement of the impact sensor data with the crash related non-impact sensors data and the vehicle telemetry data. The required agreement may be established by observing the time correlation between the impact, non-impact and vehicle telemetry data and comparing the observations to those expected for 'true' crash detections.

For example, referring to FIG. 3, in module 340 a crash detection algorithm processes the accelerometer data to make a preliminary crash detection decision and to determine the time of the associated accelerometer crash pulse. For example, as is known, if Ax and Ay represent filtered acceleration data in the vehicle's forward x-direction and the vehicle's right-side y-direction, respectively, the resultant acceleration amplitude, Rxy, data may be computed using the square root of the sum of the squares formula, a. $Rxy=\sqrt{(Ax^2+Ay^2)}$; where $\sqrt{(\ )}$ is the square root function. A Preliminary Crash Detection output flag is set to TRUE whenever Rxy exceeds a preset detection threshold, Td; otherwise the Preliminary Crash Detection output flag is FALSE. The 'crash pulse' may be defined by the Rxy data that occurs when Rxy>Td. Module 350 in FIG. 3 processes sound data from the microphone to determine a total sound amplitude measurement. The sound amplitude versus time data and the crash pulse versus time data are compared in module 370. This operation may, for example, set (an otherwise FALSE) Sound Agreement output flag to TRUE if there is an increase in the sound data as expected when the Rxy>Td defined crash pulse is actually associated with a vehicle crash. Module 360 in FIG. 3 gathers speedometer data from the OBDII diagnostic port to provide vehicle speed versus time data. The speed versus time data and the crash pulse versus time data are compared in module 380. This operation may, for example, set (an otherwise FALSE) Speed Agreement output flag is set to TRUE if there is a sudden change in the vehicle speed as expected if the Rxy>Td defined crash pulse is actually associated with a vehicle crash. In alternative embodiments the vehicle speed input to module 360 is obtained from a GPS receiver (which is a non-impact sensor).

Figure 4A:
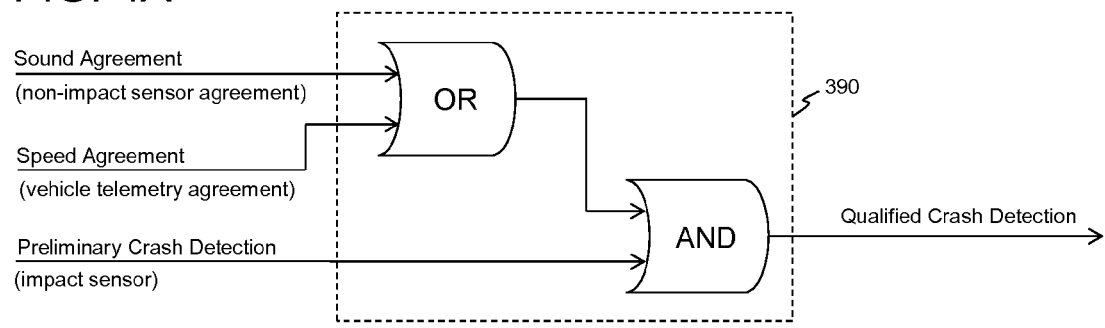
FIG. 4A depicts a logic diagram that specifies the Qualified Crash Detection to be TRUE when the Preliminary Crash Detection is TRUE and either the Sound Agreement is TRUE or the Speed Agreement is TRUE in one embodiment.
Figure 4B:
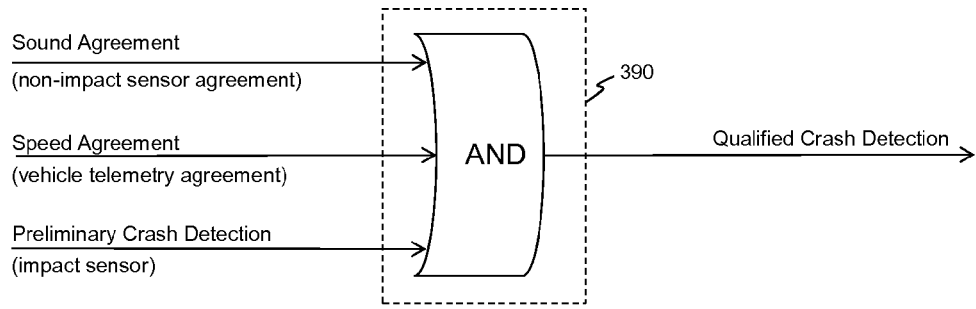
FIG. 4B depicts a logic diagram that specifies the Qualified Crash Detection to be TRUE when the Preliminary Crash Detection is TRUE and both the Sound Agreement and the Speed Agreement are TRUE in one embodiment.

The Qualification Logic module 390 in FIG. 3 combines the processing results of the impact sensor based crash detection algorithm module 340 and the agreement results from modules 370 and 380 which compare the crash pulse data to the sound amplitude data and the speedometer data, respectively. When these results are represented as logical TRUE/FALSE flags, the implementation of module 390 may be expressed using logic gates. For example, FIG. 4A specifies the Qualified Crash Detection logic flag to be TRUE when the Preliminary Crash Detection logic flag is TRUE and either the Sound Agreement logic flag is TRUE or the Speed Agreement logic flag is TRUE. The more conservative logic in FIG. 4B requires both of the 'Agreement' flags to be TRUE in order for the Qualified Crash Detection logic flag to be TRUE. However, the performance of the qualification logic in module 390 also depends on the processing parameters in modules 340, 370 and 380 which influence the performance of the inputs to 390. For example, the crash detection performance of the liberal logic in FIG. 4A may be made essentially equivalent to that of the conservative logic of FIG. 4B if the processing parameters in modules 370 and 380 are made more conservative, i.e., are adjusted to reduce the likelihood that their corresponding Agreement flags are TRUE.

Referring again to FIG. 2, the Qualified Crash Detection decision is output from operation 240 and input to operation 250 which computes the ISP based on the relevant crash analysis parameters and qualifies a decision to call 911 or not. The qualified decision to call 911 in operation 250 may, for example, be based upon a systematic combination of the value of the ISP and the occupant's response to a "Do you want to call 911?" question generated by the AACN.

The ISP may be computed using the algorithm, in particular, the ISP in % is given by:

ISP=100*(A/(1+A)); where A=exp(Sum); and Sum=Co+Cdv+Cdoi+Cbelt+Cveh+Cmulti+Cold+Cfem; with: Co=−15.208; Cdv=3.603*ln(DeltaV); Cdoi=1.089 if front impact,
  i. =2.020 if right impact,
  ii. =2.867 if left impact,
  iii. =0.0 if rear impact;
    Cbelt=−1.45 if all occupants belted, else=0.0;
    Cveh=−0.203 if utility,
  iv. =−1.116 if van,
  v. =0.167 if pickup,
  vi. =0.0 if car;
    Cmulti=0.639 if multiple crash/impact events, else 0.0;
    Cold=0.991 if at least one occupant is 55 years or older, else 0.0; and
    Cfem=0.450 if at least one occupant is female, else 0.0; where "*" denotes multiplication, "/" denotes division, "exp( )" denotes the natural exponential function, "ln" denotes the natural logarithm and DeltaV denotes the change in the vehicle velocity from the crash. Other ISP algorithms may be used in lieu of the one above. For example, the earlier URGENCY algorithm may be used here.

FIG. 5 is a table listing the coefficients of the above example ISP algorithm along with the input source and the availability of the coefficient at the time when operation 250 of FIG. 2 is required to provide an automatic qualified decision to initiate a 911 emergency call or not. The first 5 elements in the table are DeltaV, DOI, Multiple Impacts, Seatbelts in Use, and Vehicle Type. These five data elements are the inputs to the ISP algorithm that are available to operation 250 for qualifying the call-911 decision. Note that these are the same five elements that were earlier recommended for AACN-to-ISP transmission to improve the AACN/ISP/PSAP procedures. The remaining two data elements in the table of FIG. 5 are the remaining two inputs of above ISP algorithm, e.g., for the Cold and Cfem coefficients. These coefficients are defined by whether the crashed vehicle contains: 1) an occupant that is female and 2) an occupant that is age 55 years or older. However, this information may only be known by an occupant of the crashed vehicle and therefore, for the AACN/PSAP emergency notification system of interest here, this information may not be available to operation 250. As indicated in FIG. 5, it may be obtained later when a 2-way voice call is established between the 911 operator and the vehicle occupants, i.e., in operation 280 of FIG. 2.

Figure 6:
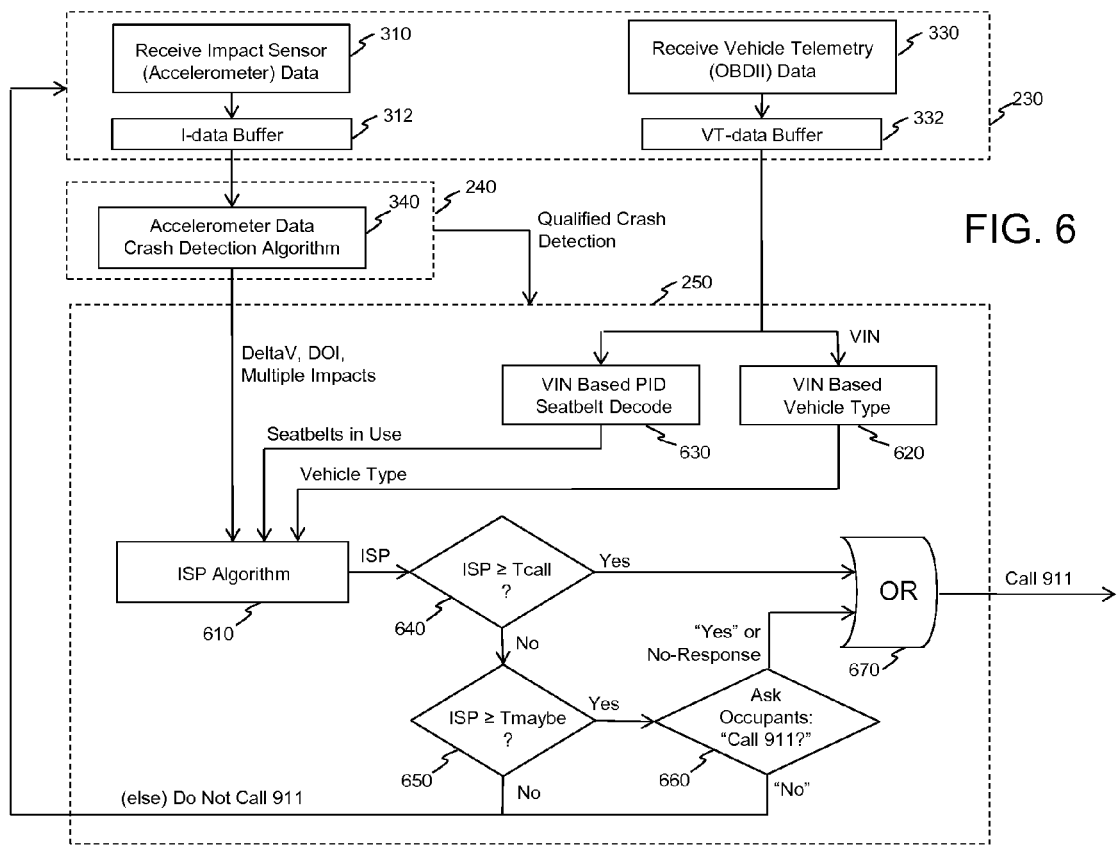
FIG. 6 depicts a block diagram of an embodiment for automatically making the decision to make a 911 emergency call or not.

FIG. 6 shows a block diagram of an example embodiment for automatically making the decision to place a 911 emergency call or not. The decision is made in operation 250 based in part on the output of an ISP Algorithm 610. The ISP Algorithm 610 may, for example, use the above definition of ISP and the above 5 inputs that are available to the second stage operation 250 when it is activated by the reception of a Qualified Crash Detection from the first stage operation 240. The 5 example inputs to the example ISP algorithm in operation 610 will now be considered in more detail.

The Vehicle Type information is available from decoding the VIN in operation 620 to identify the four ISP defined Vehicle Types, i.e., "utility", "van", "pickup" or "car". The VIN is available using an OBDII standard PID and this conversion of VIN to Vehicle Type 620 need only be performed upon installation of the AACN device into the vehicle. For example, VIN decoding may take place with the aid of installation/initialization procedures that include, for example, a one-time communications with an Internet server.

The seatbelt use data are available from OBDII access to the vehicle telemetry data using non-standard PIDs. For example, obtaining the non-standard PIDs that provide access to the seatbelt use data of interest can also be part of the installation/initialization procedure. VIN decoding to vehicle manufacturer, year and model allows a one-time table-lookup of the PIDs associated with the seatbelt status data. These PIDs can be stored in the AACN and used by operations 330 to receive the vehicle telemetry data that is associated with seatbelt use/status. Operation 630 may then interpret the seatbelt use/status data in order to set the Seatbelts in Use parameter that is required by the ISP algorithm 610.

The accelerometer/impact sensor based Crash Detection Algorithm in operation 340 may readily provide the DeltaV, DOI, and Multiple Impact parameters that are needed for the Cdv, Cdoi, and Cmulti coefficients, respectively. As is known, DeltaV may be obtained by integrating the acceleration crash pulse data, $Rxy=\sqrt{(Ax^2+Ay^2)}$ where again, Ax and Ay are the acceleration data in the vehicle's forward x-direction and the vehicle's right-side y-direction. The DOI, i.e., the impact angle, $\Psi$, may be obtained with the 2 argument arctangent function, atan 2, as $\Psi$=atan 2(Ay, Ax). Vehicle crashes that involve multiple impacts, i.e., that result in the ISP coefficient Cmulti being TRUE, may also be determined by the Crash Detection Algorithm. For example, a crash pulse can be defined as being detected when Rxy data is greater than a preset detection threshold for at least 30 milliseconds. Multiple crash/impacts can be defined as occurring when: 1) more than one crash pulse is detected and 2) these crash pulses are separated from each other by more than 300 milliseconds. Such accelerometer crash pulse analysis is known and, for example, discussed in general by M. Huang in his reference work, *Vehicle Crash Mechanics*, CRC Press, New York, (2002). FIG. 6 illustrates the ISP Algorithm 610 inputting the DeltaV, DOI, and Multiple Impacts parameters from Crash Detection Algorithm operation 340.

As diagramed in the example embodiment of the application in FIG. 6, the decision to call 911 in operation 250 is based upon the value of the ISP computed by the ISP Algorithm 610, or possibly, the occupant's response to a "Do you want to call 911?" question in operation 660. The computed ISP value is first compared to a preset threshold Tcall in operation 640 and if the ISP value is greater than Tcall the 'Call 911' decision/command is immediately output from operation 250 (to operation 270 as discussed above and diagrammed in FIG. 2). In this ISP≥Tcall case, the high ISP value indicates a high probability of serious injury and it is desirable for the AACN to automatically initiate a 911 emergency call without asking permission from the vehicle occupants. The value of Tcall may be set to approximately 7%, for example, since an ISP≥20% is a considered to be "high-risk" and "warrant special recognition and action" according to the CDC Expert Panel recommendations in *Advanced Automatic Collision Notification and Triage of the Injured Patient*, US Dept. Health and Human Services, CDC (2008).

Continuing to refer to FIG. 6, if the computed ISP value is less than Tcall process flow continues from operation 640 to operation 650 wherein the ISP value is compared to a preset threshold Tmaybe that is less than Tcall but greater than zero. If ISP≥Tmaybe is TRUE, process flow goes to operation 660 wherein the AACN device asks the vehicle occupant(s) for permission to make a 911 call. The desired value of Tmaybe is one that does not bother the vehicle occupants for minor crashes, such as backing into a wall at 3 miles per hour but does ask the occupants if a 911 call is desired for crashes that, although not severe, may possibly warrant a 911 call. Based on the inventors' experience, setting Tmaybe to approximately 0.5% is suitable for these purposes.

If the processing in operation 660 determines that either: 1) a vehicle occupant indicates that 911 call is desired or 2) there is no response from an occupant within, say 10 seconds, then process flow continues to the OR operation 670 and the 'Call 911' decision/command is output from operation 250. Conversely, if the ISP<Tmaybe in operation 650 or if the processing in operation 660 determines that the vehicle occupant(s) indicate a 911 call is NOT desired, then process flow returns to operation 230 which receives vehicle crash related telemetry and sensor data for continued AACN monitoring.

Note that there are various methods of implementing operation 660 in FIG. 6. For example, the AACN device may employ an IVR system to generate a "Do you want to call 911?" speech message through an audio output system and perform voice recognition on the occupant's verbal response. In an alternative method, operation 660 may generate a "Press the horn for 3 seconds to call 911." speech message and perform horn sound recognition to confirm. This latter method is described in U.S. patent application Ser. No. 13/907,885, titled "Horn Input to In-Vehicle Devices and Systems".

Also note when the above ISP Algorithm is used in operation 610 of FIG. 6, the Cold and Cfem coefficients have assumed values, either 0.991 or 0.0 and either 0.450 or 0.0, respectively. The performance of the 'Call 911' decision of operation 250 is independent of the assumptions on Cold and Cfem, provided the Tcall and Task thresholds in operations 620 and 630 have been developed with the same assumed values for the Cold and Cfem.

A satisfactory method of setting the thresholds Tcall and Task is to download real-world crash test data from the NHTSA Vehicle Crash Test Database and feed the associated accelerometer and Vehicle Type data into a simulation of the processing operations that are diagrammed in FIG. 6. The simulation's Accelerometer Data Crash Detection Algorithm 340 may be used to produce the DeltaV, DOI and Multiple Impacts or these parameters may be pulled from the NHTSA crash test data. The Vehicle Type is contained in the crash test documentation and the Seatbelts in Use may be varied for the present purpose of setting the thresholds Tcall and Task. Since the NHTSA crash test data is both extensive and well documented it allows a selection of crash test data that supports an empirical setting of Tcall and Task. For example the settings of Tcall=7% and Tmaybe=0.5%, that allow the second stage emergency call decision operation 250 to 'function without significant levels of false positives' as required in *The Recommendations of the National Mayday Readiness Initiative*, US DOT (2000).

Figure 7:
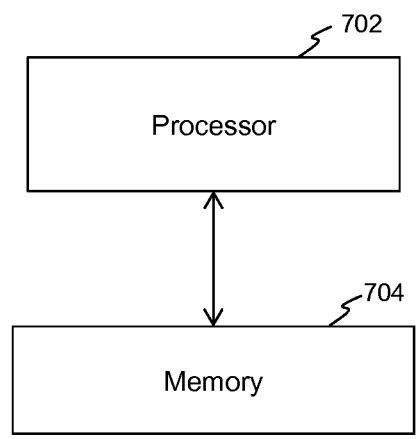
FIG. 7 depicts a diagram of a processor and a connected memory that can be resident on one or more of the devices or operations according to an embodiment of the application.

Note that any reference to an algorithm described or depicted herein is software or a computer program that is run by a processor resident on one or more devices or operations described or depicted herein. FIG. 7 depicts a processor 702 and a connected memory 704 that can be resident on any of the devices described or depicted herein, for example the AACN device or system diagramed in FIG. 2.

Novel techniques have been described for in-vehicle emergency telematics devices and systems to automatically qualify vehicle crash events before directly placing a 3-digit emergency call to a local PSAP operator. The qualification is performed in two stages. The first stage provides a qualified crash detection decision wherein the preliminary crash detection based on impact sensors is qualified by non-impact sensors and telemetry data. Given a detected crash, the second stage provides a decision on making the emergency call based on a computed ISP score and, possibly, a confirmation from the vehicle occupants. Many variations of the processing details and the arrangements of the processing operations are possible relative to the example embodiment that has been discussed. For example, the components of the 'receive input' operation 230 may instead be included in operation 240. Also, different parameters may be chosen for computing the ISP or for detecting and qualifying the vehicle crash. Such variations should be obvious to one skilled in the art and are, therefore, considered to be contained in the application.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium (non-transitory storage medium) may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the systems can be performed by one or more of the operations or components described herein or in a distributed architecture and may include a transmitter, receiver or pair of both. For example, all or part of the functionality performed by the individual operations, may be performed by one or more of these operations. Further, the functionality described herein may be performed at various times and in relation to various events, internal or external to the operations or components. Also, the information sent between various operations can be sent between the operations via at least one of: a data network, the Internet, a voice network, an Internet Protocol network, a wireless device, a wired device and/or via plurality of protocols. Also, the messages sent or received by any of the operations may be sent or received directly and/or via one or more of the other operations.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as operations, in order to more particularly emphasize their implementation independence. For example, a operation may be implemented as a hardware circuit comprising custom very large scale integration (VLSI) circuits or gate arrays, off-the-shelf semiconductors such as logic chips, transistors, or other discrete components. A operation may also be implemented in programmable hardware devices such as field programmable gate arrays, programmable array logic, programmable logic devices, graphics processing units, or the like.

A operation may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified operation need not be physically located together, but may comprise disparate instructions stored in different locations which, when joined logically together, comprise the operation and achieve the stated purpose for the operation. Further, operations may be stored on a computer-readable medium, which may be, for instance, a hard disk drive, flash device, random access memory (RAM), tape, or any other such medium used to store data.

Indeed, a operation of executable code could be a single instruction, or many instructions, and may even be distributed over several different code segments, among different programs, and across several memory devices. Similarly, operational data may be identified and illustrated herein within operations, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   receiving accelerometer data indicating a change in a motor vehicle velocity;
   processing the accelerometer data to determine acceleration amplitude versus time date;
   determining a preliminary crash detection decision indicating that the motor vehicle may have experienced a crash when the acceleration amplitude is greater than a predetermined accelerometer threshold;
   determining a time associated with the preliminary crash detection decision;
   receiving velocity data of the motor vehicle;
   processing the velocity data to determining amplitude of change in velocity versus time data at time data associated with the preliminary crash decision; and
   determining the motor vehicle has experienced a crash if the amplitude of change in velocity data is above at least one of a predefined velocity threshold or a percentage change velocity threshold when the value of the acceleration amplitude data was determined to be greater than the predefined accelerometer threshold.

2. The method of claim 1, further comprising:
   generating accelerometer crash pulse data determined as the amplitude of the acceleration data versus time data when the acceleration amplitude is greater than the predetermined accelerometer threshold;
   comparing the velocity data versus time data to the crash pulse data; and
   determining whether the motor vehicle has experienced a crash based on results of the comparison.

3. The method of claim 1, wherein the velocity of the motor vehicle was obtained from at least one of the speedometer or via global position system (GPS) measurements.

4. The method of claim 1, wherein the determining the motor vehicle has been in a crash is performed via an on-board diagnostic II (OBD-II) device.

5. An apparatus comprising:
   a receiver configured to receive accelerometer data indicating a change in a motor vehicle velocity;
   a receiver configured to receive velocity data of the motor vehicle; and
   a processor configured to
      process the accelerometer data to determine acceleration amplitude versus time data;
      process the acceleration amplitude versus time data to determine a preliminary crash detection decision indicating that the motor vehicle may have experienced a crash at a preliminary crash time determined by the acceleration amplitude being greater than a predetermined accelerometer threshold;
      process the velocity data of the motor vehicle to determine amplitude of velocity change versus time data at the preliminary crash time;
      determine the motor vehicle has been in a crash based on the comparing of the acceleration amplitude versus time data and the velocity change versus time data at the preliminary crash time;
      wherein the processor is configured to compare by determining whether the value of the amplitude of velocity change is above at least one of a predefined velocity threshold or a percentage change velocity threshold when the value of acceleration amplitude was determined to be greater than the predefined accelerometer threshold.

6. The apparatus of claim 5, wherein the processor is further configured to:
   generate accelerometer crash pulse data as the amplitude of the acceleration data versus time data when the acceleration amplitude is greater than the predetermined accelerometer threshold;

compare the velocity data versus time data to the crash pulse data; and determine whether the motor vehicle has experienced a crash based on results of the comparison.

7. The apparatus of claim 5, wherein the velocity of the motor vehicle was obtained from at least one of the speedometer or via global position system (GPS) measurements.

8. The apparatus of claim 5, wherein the processor is configured to determine the motor vehicle has been in a crash via an on-board diagnostic II (OBD-II) device.

9. A non-transitory computer readable storage medium configured to store instructions that when executed causes a processor to perform:

receiving accelerometer data indicating a change in a motor vehicle velocity receiving velocity data of the motor vehicle;

processing the accelerometer data to determine acceleration amplitude versus time data;

processing the acceleration amplitude versus time data to determine a preliminary crash detection decision indicating that the motor vehicle may have experienced a crash at a preliminary crash time determined by the acceleration amplitude being greater than a predetermined accelerometer threshold;

processing the velocity data of the motor vehicle to determine amplitude of velocity change versus time data at the preliminary crash time;

determining the motor vehicle has been in a crash based on the comparing of the acceleration amplitude versus time data and the velocity change versus time data at the preliminary crash time;

wherein the processor is configured to compare by determining whether the value of the amplitude of velocity change is above at least one of a predefined velocity threshold or a percentage change velocity threshold when the value of acceleration amplitude was determined to be greater than the predefined accelerometer threshold.

10. The non-transitory computer readable storage medium of claim 9, wherein the processor is further configured to perform:

generating accelerometer crash pulse data as the amplitude of the acceleration data versus time data when the acceleration amplitude is greater than a predetermined accelerometer threshold;

comparing the velocity data versus time data to the crash pulse data; and determining whether the motor vehicle has experienced a crash based on results of the comparison.

11. The non-transitory computer readable storage medium of claim 9, wherein the velocity of the motor vehicle was obtained from at least one of the speedometer or via global position system (GPS) measurements and the determining the motor vehicle has been in a crash is performed via an on-board diagnostic II (OBD-II) device.

* * * * *